(12) United States Patent
Shiner et al.

(10) Patent No.: US 10,857,627 B2
(45) Date of Patent: Dec. 8, 2020

(54) HIGH POWER FIBER LASER EFFUSION HOLE DRILLING APPARATUS AND METHOD OF USING SAME

(71) Applicant: IPG PHOTONICS CORPORATION, Oxford, MA (US)

(72) Inventors: William Shiner, Oxford, MA (US); Steven Maynard, Oxford, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 271 days.

(21) Appl. No.: 15/865,370

(22) Filed: Jan. 9, 2018

(65) Prior Publication Data
US 2018/0141165 A1 May 24, 2018

Related U.S. Application Data

(62) Division of application No. 14/309,348, filed on Jun. 19, 2014, now abandoned.

(51) Int. Cl.
*B23K 26/382* (2014.01)
*B23K 101/00* (2006.01)
*B23K 103/04* (2006.01)
*B23K 103/10* (2006.01)
*B23K 103/14* (2006.01)
(Continued)

(52) U.S. Cl.
CPC ...... *B23K 26/389* (2015.10); *B23K 2101/001* (2018.08); *B23K 2103/04* (2018.08); *B23K 2103/05* (2018.08); *B23K 2103/10* (2018.08); *B23K 2103/14* (2018.08); *B23K 2103/26* (2018.08); *B23K 2103/52* (2018.08);
(Continued)

(58) Field of Classification Search
CPC ............. B23K 26/389; B23K 26/382; B23K 2101/001
See application file for complete search history.

(56) References Cited

U.S. PATENT DOCUMENTS

| | | | |
|---|---|---|---|
| 5,083,006 A * | 1/1992 | Stroud | B23K 26/048 219/121.71 |
| 6,172,330 B1 * | 1/2001 | Yamamoto | B23K 26/0661 219/121.7 |
| 2008/0123694 A1 * | 5/2008 | Nakamae | G02B 6/4296 372/6 |

FOREIGN PATENT DOCUMENTS

| | | | | |
|---|---|---|---|---|
| WO | WO-2013096374 A1 * | 6/2013 | | B23K 26/385 |
| WO | WO-2013192612 A1 * | 12/2013 | | B23K 26/046 |

OTHER PUBLICATIONS

Tu et al., "Process Anatomy for High Aspect Ratio Micro-Hole Drilling with Short Micro-second Pulses Using a CW Single-Mode Fiber", Jul. 2013, Applied Physics Research; vol. 5 No. 4, pp. 1-15. (Year: 2013).*

(Continued)

*Primary Examiner* — Geoffrey S Evans

(57) ABSTRACT

A fiber laser-treated workpiece is configured with a body having a discontinuous surface which defines a plurality of spaced through-going passages so that each passage is delimited by a peripheral layer having a surface characteristic which includes a recast layer or one or more microcracks or a combination thereof. The passages are provided by a high power Yb fiber laser operating in a pulsed regime and configured to output either a single pulse per an entire passage or a train of pulses per the passage. The Yb fiber laser is so configured that, if formed, the recast layer and micro-crack each are smaller than respective standards in an airspace industry.

6 Claims, 5 Drawing Sheets

(51) Int. Cl.
*B23K 103/18* (2006.01)
*B23K 103/00* (2006.01)

(52) U.S. Cl.
CPC .................. *Y10T 428/12361* (2015.01); *Y10T 428/24273* (2015.01)

(56) References Cited

OTHER PUBLICATIONS

Dilworth, "Feasability Study of Laser Ablation using Long Pulsed 300 W, CW single mode Fiber Laser" thesis, North Carolina State University. (Year: 2005).*

* cited by examiner

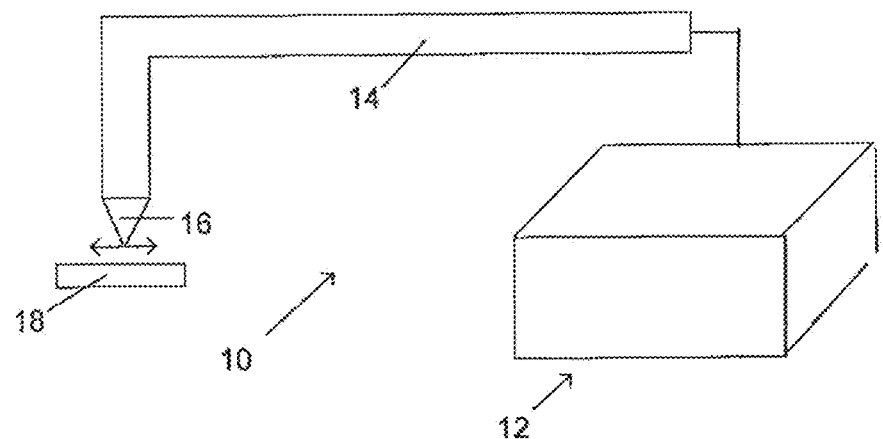
FIG. 1
FIG. 2
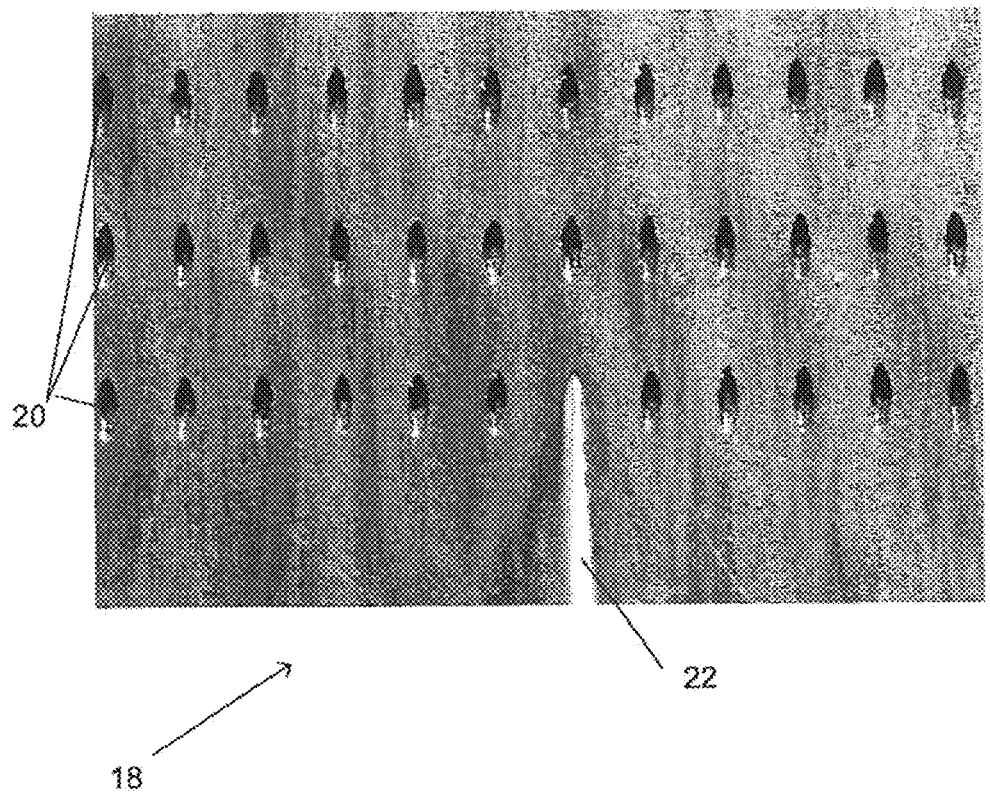

HIGH POWER FIBER LASER EFFUSION HOLE DRILLING APPARATUS AND METHOD OF USING SAME

BACKGROUND OF THE DISCLOSURE

Field of the Disclosure

The disclosure relates to high power fiber laser devices used for treating aerospace engine materials. In particular, the disclosure relates to a high power pulsed fiber laser system for drilling holes/passages in aerospace materials and a method of efficient and repetitive drilling of substantially uniform holes using the high power pulsed fiber laser.

Prior Art Discussion

Laser machining including drilling is a fusion process where the base material that is not vaporized or removed during the liquid state resolidifies and becomes a recast layer. In the case of the conventional laser drilling process, a recast layer is usually formed from the resolidified molten material at the side walls of the drilled holes. Recast layers are particularly undesirable where drilled holes/passages are traversed by a cooling medium. The industry standard requires a recast layer to be about 0.005" thick or less. But even this thin of a recast layer is highly undesirable.

Rapid solidification of processed metal results in microcracks that often extend into the parent material. The acceptable width of micro-cracks in the industry is about 0.0016". Yet, as miniscule the acceptable width is, such micro-cracks tend to reduce part life.

Aerospace gas turbines require a large number of small diameter holes (<1 mm) to provide cooling in the turbine blades, nozzle guide vanes, combustion chambers and afterburner. Many thousands of holes are introduced in the surface of these components to allow a film of cooling air to flow over the components when the turbines are operating. Film cooling both extends the life of the component and enables extra performance to be achieved from the engine. A typical modern engine will have—100,000 such holes/passages. Drilling these cooling holes by high peak power pulsed Nd-YAG laser is now well established even though the recast and micro-cracking problems remain largely unresolved.

As one of ordinary skill in the laser arts knows, every type of laser has its advantages and disadvantages in the context of specific purposes, such as providing aerospace components with a plurality of holes. Referring specifically to Nd-YAG lasers, the advantages include, among others, good coupling of radiation in a 1 µm wavelength range into part and high pulse energies and peak powers.

However, a single mode ("SM") Nd-YAG laser is also known to have limitations that may not always render its use in the aerospace industry efficient because its performance drifts. For example, the power distribution across the laser beam may not always be homogeneous due to a typically used Gaussian beam having a small radius dome-shaped cross-section. Furthermore, a pulse width may fluctuate: Equally troubling is the difficulty of controlling peak-to-peak powers of respective subsequent pulses. Accordingly, drilled holes, in addition to typical recast layers and microcracks, may have different roundness, consistency and, therefore, may not be of the desired quality which the industry demands.

A further limitation may relate to a relatively low frequency of pulsing due to limitations in the flash lamps and power supplies which are typically designed for low repetition rates and high peak powers per pulse. As a general rule, trying to increase the repetition rate results in a sharp decrease in maximum power per pulse. With the current demand for higher power and higher repetition rates, currently used Nd-YAG lasers may not meet these requirements.

Furthermore, traditional Nd-YAG lasers, as one of ordinary skill in the laser art knows, have a complex cavity design typically requiring a directly cooled crystal rod that is sealed with 0-rings in an enclosed water jacket. There are many extra-cavity optic elements required to correct for thermal distortion in the Nd:YAG rod. All these elements must be properly maintained, which requires a complex controlling means; otherwise, thermal instability inside and outside the cavity may result in noticeable differences in beam output characteristics leading to drilled passages with markedly different recast thicknesses and therefore poor uniformity.

A need therefore exists for a laser treated workpiece provided with a plurality of uniform passages so that an average recast layer, if formed at all, is substantially thinner than the industry standard.

Another need exists for a laser treated workpiece provided with a plurality of uniform passages so that base crack depth levels in the components are lower than the industry standard. Another need exists for a fiber laser system configured so that a plurality of uniform passages, laser drilled in a workpiece, have respective peripheries formed with minimal recast layers and microcracks which have respective levels lower than the industry established standards.

Another need exists for a method of laser drilling a plurality of passages in a workpiece so that recast layer and base micro-crack levels, if formed on peripheries of respective passages, are substantially lower than respective industry standards.

Another need exists for a method of laser drilling a plurality of passages in a workpiece so that the uniformity of the diameter of the passage diameters is substantially lower than respective industry standards.

SUMMARY OF THE DISCLOSURE

The above and other needs are met by the teaching provided by the present invention. In particular, this disclosure teaches a workpiece, a method for laser treating the workpiece and an apparatus for practicing the method. The apparatus is so configured and the method is so practiced that the body of the workpiece is provided with a plurality of substantially uniform passages having better quality than that offered by the current Nd:YAG technology in the aerospace industry.

In accordance with one aspect of the disclosure, a laser treated workpiece is provided with a discontinuous body defiling a plurality of drilled passages. The walls of the drilled passages each are configured so that a recast layer, if formed at all, has a thickness substantially smaller than about 0.005" which is the current industry standard. The micro-cracks on a resolidified recast layer have a width smaller than 0.0015" which is currently the industry standard.

In accordance with a further aspect of the disclosure, a high power single mode Yb fiber pulsed laser is utilized to machine a body of workpiece. The Yb fiber pulsed laser is configured to laser treat the body so as to drill a plurality of through-going passages such that the wall of each passage may have a recast layer substantially smaller than the current industry standard of about 0.005" with at least one microcrack in the recast layer which has a depth of at least about 50% smaller than the current industry standard of about 0.0015".

In accordance with still a further aspect of the disclosure, a method for laser drilling the workpiece is such that the high power single mode Yb fiber pulsed laser is operative to radiate pulses at a pulse repetition rate exceeding 25 Hz, average power of at least 10 kW and peak power exceeding 10 kW. The method further enables the Yb fiber pulsed laser to radiate flat-top pulses at a uniform high pulse-to-pulse rate in substantially a fundamental mode. The latter is characterized by so selected parameters including, among others, substantially uniform small $M^2$ value and substantially uniform peak power, that a plurality of uniform passages are of quality superior to that one of passages produced by currently available Nd-YAG lasers.

BRIEF DESCRIPTION OF THE DRAWINGS

The above and other features and advantages of the disclosed apparatus, method and product will become more readily apparent from the specific description accompanied by the following drawings, in which:

FIG. 1 is a diagrammatic view of the disclosed fiber laser system.

FIG. 2 is a workpiece having a plurality of passages which are provided in accordance with the disclosed method and apparatus practicing the disclosed method.

SPECIFIC DESCRIPTION

Figure 3:
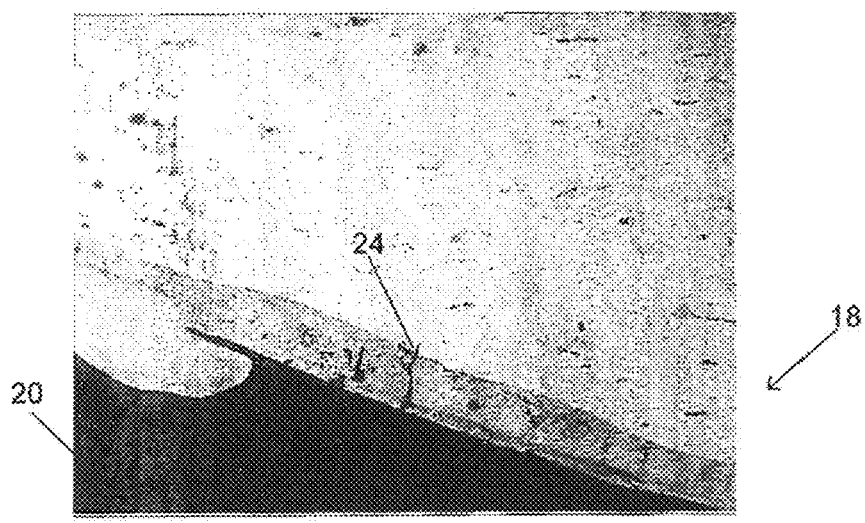
FIGS. 3-7 are computer generated shots illustrating respective micro-cracks obtained with differently configured pulses which are emitted by the disclosed apparatus and method.

Reference will now be made in detail to several embodiments of the invention that are illustrated in the accompanying drawings. Wherever possible, same or similar reference numerals are used in the drawings and the description to refer to the same or like parts or steps. Certain drawings are in simplified form and are not to precise scale. The word "couple" and similar terms do not necessarily denote direct and immediate connections, but also include connections through intermediate elements or devices.

FIG. 1 illustrates a fiber laser drilling system 10 including a high power fiber laser 12, a beam delivery system 14 typically having beam guiding optics which guides the laser output beam to a laser head 16. The latter is operative to focus the beam on the desired location of a workpiece 18 and typically has up to twelve (12) degrees of freedom so as to allow for convenient displacement of the head and workpiece relative to one another along a predetermined path over a plurality of locations corresponding to respective passages to be drilled.

The fiber laser 12 includes a plurality of separate laser modules each provided with an Ytterbium ("Yb") oscillator operative to output at about 500 W or higher. The configuration may be altered by utilizing known to one of ordinary skill in the laser art master oscillator and power amplifier ("MOPA") schematics. Preferably, the laser is a model YLRxxxx available from IPG Photonics Corporation, Oxford, Mass.

The cumulative output of the modules—system light—can easily reach a multi-kW level ranging between about 10 kW and about 20 kW and higher. The Yb fiber laser 12 is configured to emit square-shaped pulses at a repetition rate between about 25 Hz and about 50 Hz in low multimode ("MM") radiation at wavelengths around 1070 nm. The system light has a stable, low beam product parameter ("BPP") which ranges from about 3 to about 5 and an $M^2$ value roughly around 10.

Referring to FIG. 2, specific parameters of Yb fiber laser 12 within the above-disclosed ranges are so selected that all of the drilled passages 20 are clean, free of surface splatter and have substantially uniform diameter, taper, passage entrance and clean passage exit. In other words, the pulses have a stable uniform pulse-to-pulse rate, uniform amplitude or peak power and uniform square pulse shape all leading to the formation of substantially uniform passages.

FIG. 2. Provides a workpiece 18 with oval passages having a major axis of x and a minor axis of diameter at the top surface with a standard deviation of z. The area of the surface removed by the oval equaling Aoval.

The foregoing results required by many industries including the aerospace industry have been achieved with the above-disclosed laser system treating workpiece 18 which is made from aluminum, ceramic, metallo ceramics, nickel and nickel alloys including but not limited to Hastelloy® variants, Inconel® variants including Inconel® 625, Inconel® 718, Mar-M variants, Single Crystal, carbon steels, stainless steels, Titanium and/or Waspalloy® variants and various oxides, alloys and combinations of these.

Referring to FIGS. 3-7, the importance of disclosed system 10 of FIG. 1 becomes readily apparent from experimental results including the formations and dimensions of recast layers and micro cracks in workpiece 18 which may be configured, without any limitation, as turbine blades, nozzle, guide vanes, combustion chambers and afterburner and others. The following parameters are common to all of the experiments shown in respective FIGS. 3-6 and include laser system 10 outputting fifteen (15) square pulses at a repetition rate 25 Hz and with at 15 kW peak power per each pulse. Despite different pulse widths, as disclosed below, an average time necessary for drilling the passage is about 6 seconds.

Despite different pulse with, as disclosed below, an average time necessary for drilling the passage is about 6 seconds. What were the materials?

Figure 8:
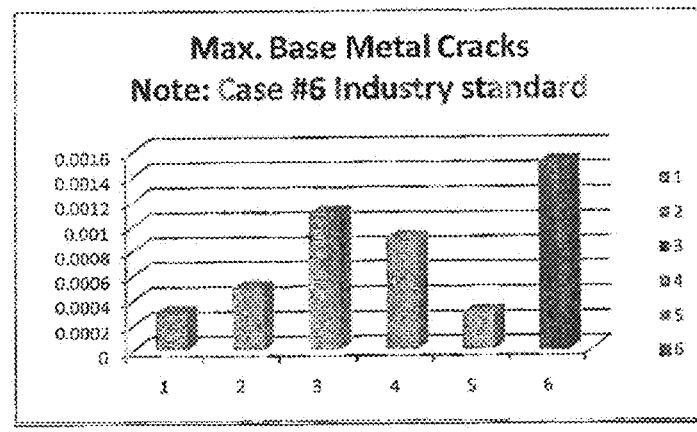
FIG. 8 is a chart summarizing the results illustrated in FIGS. 3-7 and comparing these results with industry standard.
Figure 9:
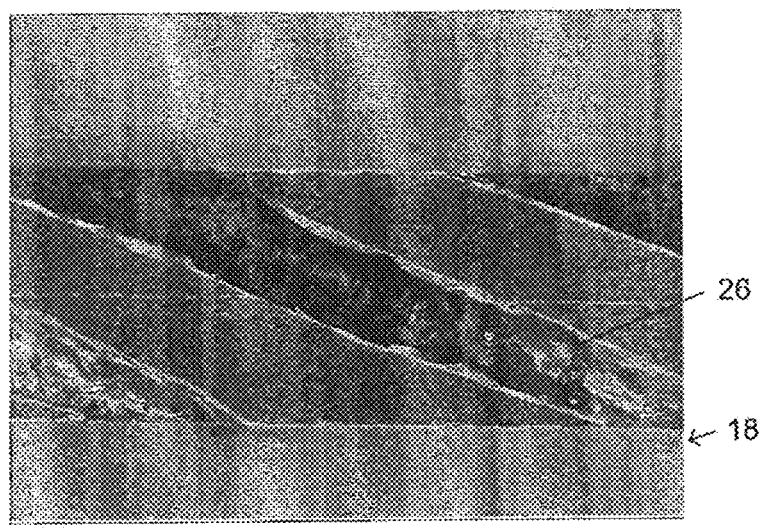
FIGS. 9-13 are respective computer generated shots illustrating recast layers produced under different operating conditions of fiber laser system of FIG. 1.
Figure 10:
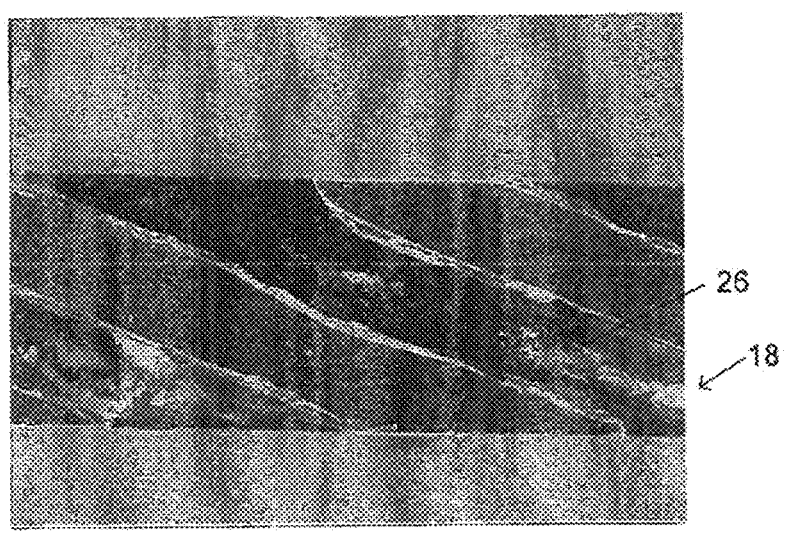
Figure 11:
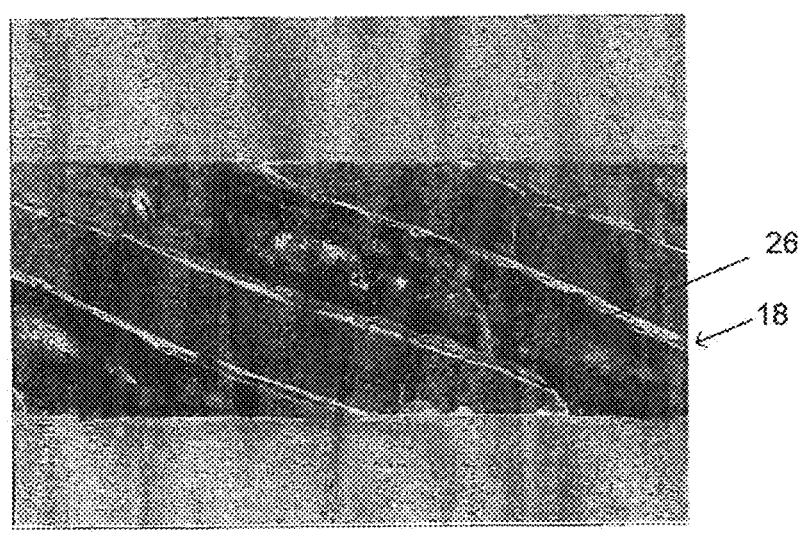
Figure 12:
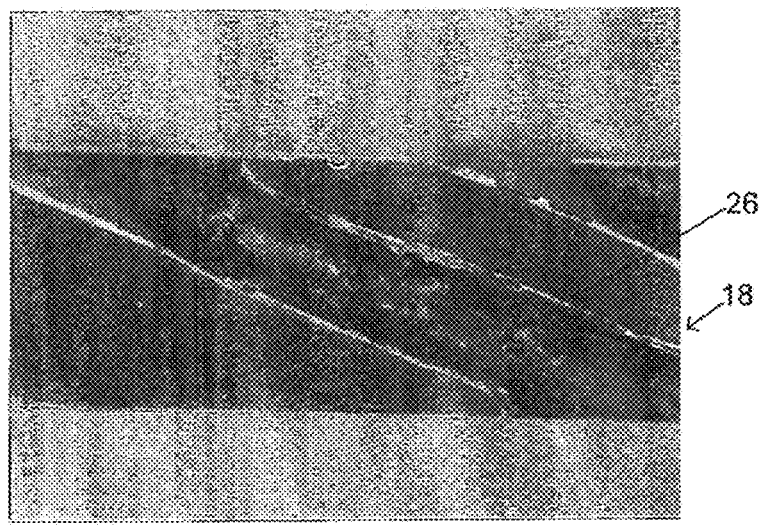
Figure 13:
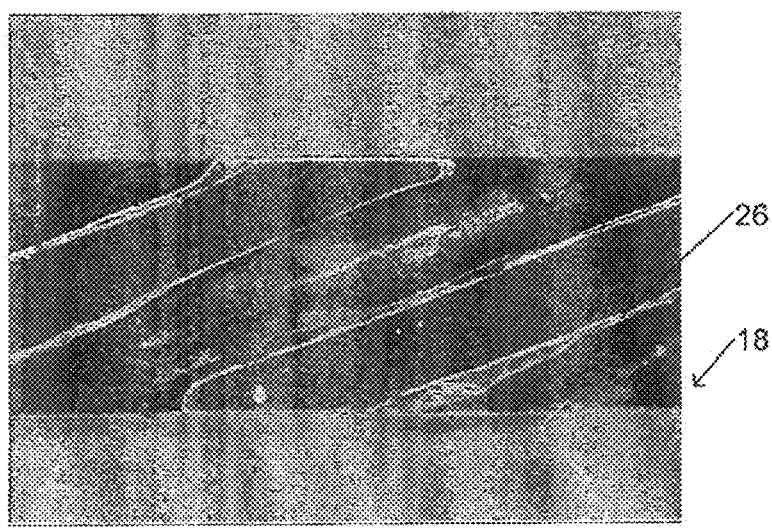

Referring specifically to FIGS. 3 and 8, system 10, which is configured with the above-listed parameters, produces a microcrack 24 on a wall of passage 20 in workpiece 18. The pulse width in this experiment is about 0.5 milliseconds. This experiment shown in FIG. 8 as 1 results microcrack 24 having a width of about 0.0004".

Figure 4:
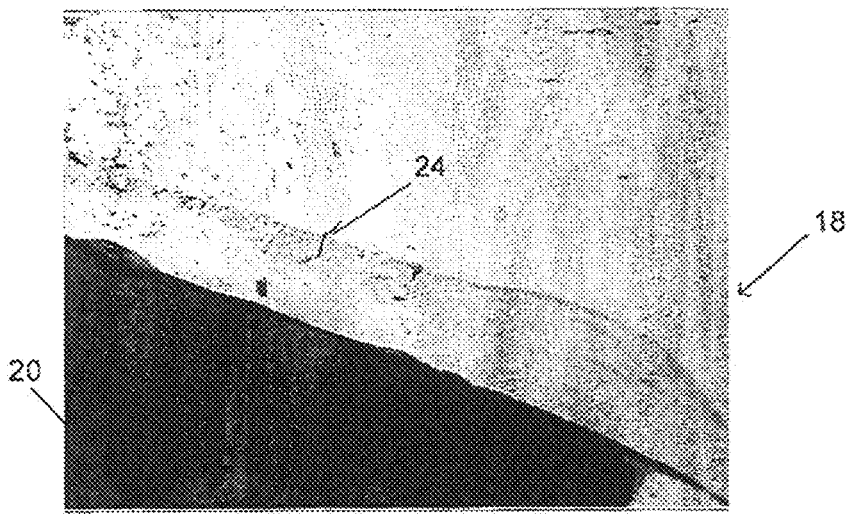

Referring specifically to FIGS. 4 and 8, system 10 is operative to output pulses each having a pulse width of 1 millisecond. Denoted by numeral reference 2 in FIG. 8, microcrack 24 is produced with about 0.0006" width.

Figure 5:
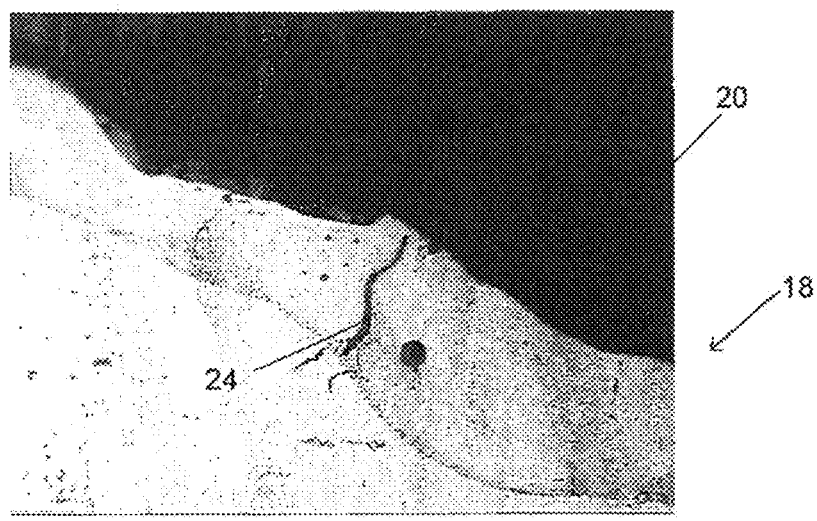

FIG. 5 illustrates the results of a pulse width of about 2 milliseconds. The result of this experiment is referenced by numeral 3 in FIG. 8 and includes the width of microcrack 24 of about 0.001".

Figure 6:
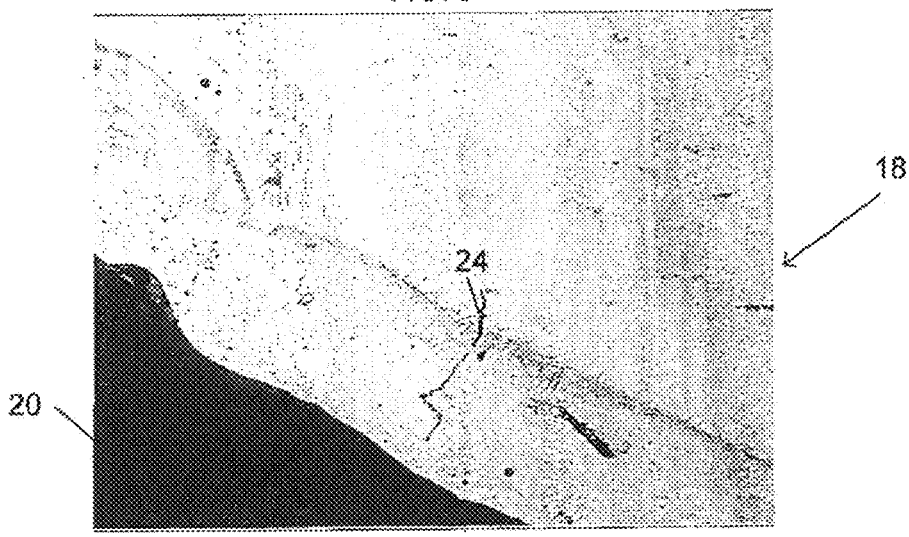

FIG. 6 illustrates the results produced by drilling workpiece 18 with laser system 10 operative to emit square pulses each with pulse width of about 3 milliseconds. This experiment corresponds to reference numeral 4 in FIG. 8 and results in about a 0.0008" width.

Figure 7:
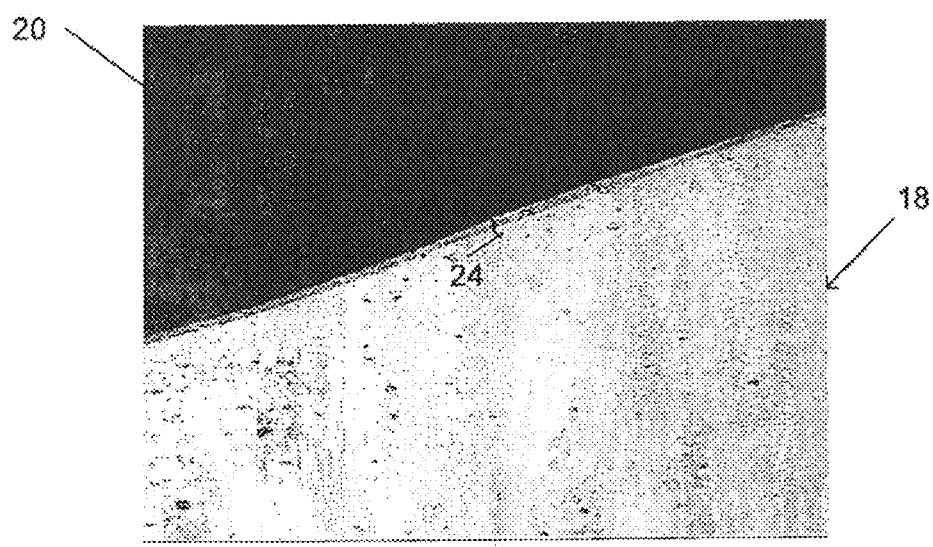

FIG. 7 illustrates microcrack 24 formed with parameters which are somewhat different from the previous four experiments. In particular, instead of a pulse train, system 10 fires a single 10 millisecond pulse, which is not available from Nd-YAG lasers. As can be seen in FIG. 8, under reference numeral 5, the result, 0.0002" width, is substantially the same as in the case of the shortest pulse width of 0.5 milliseconds in experiment 1. However, in contrast to all previous settings, the drill time per passage in this experiment is about 0.05 milliseconds which is substantially shorter than 0.6 milliseconds needed in previous experiments.

FIG. 8 clearly illustrates the advantages of using system of the present disclosure. Compared to aerospace standard of about 0.014" denoted by reference numeral 6, even the worst result obtained in experiment 3 by disclosed fiber laser system 10 is considerably better than the standard.

Referring now to FIGS. 9-14, laser system 10 configured with the same parameters as disclosed in reference to FIGS. 3-8 also shows a substantially improved recast layer's thickness compared to the aerospace industry's standard.

Figure 14:
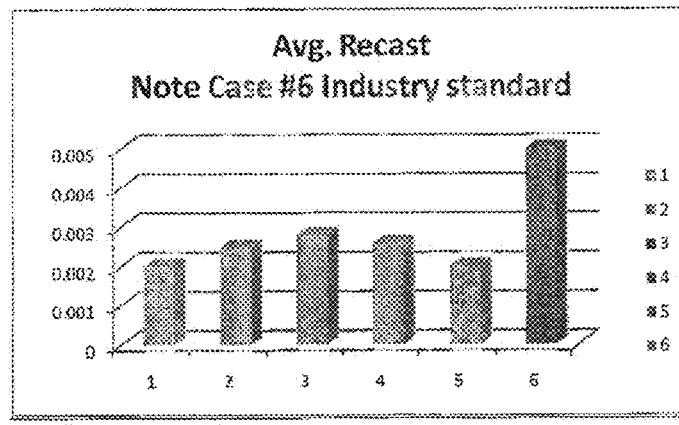
FIG. 14 is a chart illustrating the results shown in FIGS. 9-13, respectively, and compared to the industry standard.

In particular, the same five experiments corresponding to respective pulse widths 0.5, 1.0, 2.0, 3.0 and single pulse of 10 milliseconds have been conducted and resulted in a recast layer 26 clearly seen in respective FIGS. 9-13. FIG. 14 illustrates the results of five experiments referenced by respective numerals 1, 2, 3, 4 and 5 and reference numeral 6 being the industry standard.

As can be seen from FIG. 14, the first three experiments with respective pulse widths of 0.5, 1.0 and 2.0 milliseconds produced about 0.0018", 0.0022" and 0.0025" thick recast layers, respectively. The fourth setting with a 3.0 millisecond pulse width resulted in a recast layer having a thickness of about 0.0022". All of the above experiments produced the respective results, recast layer thickness lower than the standard thickness of about 0.005" corresponding to the right old column 6.

The last experiment, number 5 with a single 10 millisecond pulse width again showed to be advantageous in many respects and had substantially the same result, 0.0018", as experiment 1 with the shortest pulse width.

All the results were obtained in a certified Metallurgical laboratory and are correlated to the configuration and use of a high power MM Yb fiber laser of the present disclosure. Having described at least one of the preferred embodiments of the present disclosure with reference to the accompanying drawings, it will be apparent to those skills that the invention is not limited to those precise embodiments, and that various modifications and variations can be made in the presently disclosed workpiece, method and system for laser drilling of aerospace material. It is believed that with higher powers soon to be available, various pulse widths, shot counts and maybe even modified pulse shapes, the results may be even more encouraging Thus, it is intended that the present disclosure cover the modifications and variations of this disclosure provided they come within the scope of the appended claims.

The invention claimed is:

1. A method of effusion hole drilling in aerospace engine materials selected from the group consisting of aluminum, ceramics, metallo ceramics, nickel alloys, stainless steels, titanium, and a combination thereof by a single mode (SM) high power ytterbium (Yb) pulsed fiber laser which is operative to emit a plurality of discreet pulses incident on selected locations on the aerospace material and configured to provide a plurality of through-going and substantially uniform spaced effusion holes at respective locations, the method comprising:
controllably displacing the aerospace engine material and SM high power Yb pulsed fiber laser relative to one another among a plurality of predetermined locations along a path; and
periodically firing the SM high power Yb pulsed fiber laser at each of the locations, thereby outputting at least one pulse incident on the location so as to drill the plurality of effusion holes in the aerospace engine material,
operating the SM high power Yb pulsed fiber laser so that the at least one pulse has optical characteristics selected so that a recast layer formed on a periphery defining an effusion hole has a thickness less than 0.0015 inches and one or more microcracks having a width less than 0.005 inches.

2. The method of claim 1, wherein the periodic firing of the SM high power Yb pulsed fiber laser includes outputting a single pulse per each location, the single pulse being shaped and configured to drill an entire passage.

3. The method of claim 2, wherein the single pulse at each location has a pulse width of about 10 milliseconds, a square shape, a peak power varying between 6 kW and 20 kW.

4. The method of claim 1, wherein the periodic firing of the SM high power Yb pulsed fiber laser includes outputting a plurality of pulses per each location at a repetition rate varying between 25 Hz and 50 Hz.

5. The method of claim 4, wherein the outputting of the pulses includes configuring uniform square pulses each having a pulse width between 0.5 to 3 milliseconds.

6. The method of claim 5, wherein the outputting of the uniform pulses occurs in substantially a fundamental mode having substantially uniform parameters which include an $M^2$ value, focal point, spot size, and peak power ranging between 6 kW and 20 kW.

* * * * *